(12) United States Patent
Tanabe et al.

(10) Patent No.: US 12,390,924 B2
(45) Date of Patent: Aug. 19, 2025

(54) CURRENT LIMITING DEVICE, ROBOT SYSTEM, AND CURRENT LIMITING METHOD

(71) Applicant: KAWASAKI JUKOGYO KABUSHIKI KAISHA, Kobe (JP)

(72) Inventors: Masataka Tanabe, Kobe (JP); Shinji Kajihara, Kobe (JP); Kenta Nakamura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 336 days.

(21) Appl. No.: 18/022,566

(22) PCT Filed: Aug. 20, 2021

(86) PCT No.: PCT/JP2021/030549
§ 371 (c)(1),
(2) Date: Feb. 22, 2023

(87) PCT Pub. No.: WO2022/044990
PCT Pub. Date: Mar. 3, 2022

(65) Prior Publication Data
US 2023/0405814 A1  Dec. 21, 2023

(30) Foreign Application Priority Data
Aug. 24, 2020  (JP) ................. 2020-140784

(51) Int. Cl.
*B25J 9/16* (2006.01)
*B25J 9/12* (2006.01)
*B25J 19/06* (2006.01)
*H02P 29/40* (2016.01)

(52) U.S. Cl.
CPC ............. *B25J 9/1633* (2013.01); *B25J 9/126* (2013.01); *B25J 9/1651* (2013.01); *B25J 9/1674* (2013.01); *B25J 19/06* (2013.01); *H02P 29/40* (2016.02)

(58) Field of Classification Search
None
See application file for complete search history.

(56) References Cited

U.S. PATENT DOCUMENTS 4,776,433 A    10/1988  Lagree et al.
2011/0057590 A1  3/2011  Flanary et al.
(Continued)

FOREIGN PATENT DOCUMENTS

| CN | 115489246 A | * | 12/2022 | ............. B60G 13/08 |
| EP | 2388111 B1 | * | 2/2021 | ............. B25J 9/1674 |
| JP | 3588956 B2 | | 11/2004 | |

(Continued)

OTHER PUBLICATIONS

English translation of JP-2010194645-A (wherein the paragraph numbering provided coincides with any relevant citations to this reference within the accompanying Office Action) (Year: 2010).*

(Continued)

*Primary Examiner* — Thomas E Worden
*Assistant Examiner* — Bryant Tang
(74) *Attorney, Agent, or Firm* — Oliff PLC

(57) ABSTRACT

A current limiting device includes a current limiter to limit a current to be carried to a drive within a range of a limit value. The limit value is set to change according to a speed of the drive.

11 Claims, 9 Drawing Sheets

(56) References Cited

U.S. PATENT DOCUMENTS

| | | | |
|---|---|---|---|
| 2016/0248366 A1* | 8/2016 | Anan | B65H 5/06 |
| 2018/0036877 A1 | 2/2018 | Kamikawa et al. | |

FOREIGN PATENT DOCUMENTS

| | | | |
|---|---|---|---|
| JP | 2005-287163 A | | 10/2005 |
| JP | 2008-73790 A | | 4/2008 |
| JP | 2010194645 A | * | 9/2010 |
| JP | 2016-158751 A | | 9/2016 |
| KR | 10-1998-0073967 A | | 11/1998 |

OTHER PUBLICATIONS

English translation of EP-2388111-B1 (wherein the paragraph numbering provided coincides with any relevant citations to this reference within the accompanying Office Action) (Year: 2021).*

English translation of CN-115489246-A (wherein the paragraph numbering provided coincides with any relevant citations to this reference within the accompanying Office Action) (Year: 2022).*

* cited by examiner

CURRENT LIMITING DEVICE, ROBOT SYSTEM, AND CURRENT LIMITING METHOD

TECHNICAL FIELD

The present disclosure relates to a current limiting device, a robot system, and a current limiting method, and more particularly, it relates to a current limiting device, a robot system, and a current limiting method that each limit a current to be carried to a motor.

BACKGROUND ART

Conventionally, a robot in which an upper limit is set for a current to be carried to a motor is known. Such a robot is disclosed in Japanese Patent Laid-Open No. 2008-073790, for example.

Japanese Patent Laid-Open No. 2008-073790 discloses a robot including a robot main body in which a plurality of links are connected to each other via joints, motors provided at the joints of the robot main body, and speed reducers that slow rotation of the motors. This robot includes current measuring means that measure currents being carried to the motors. When the robot main body is stationary, upper limits are set for the currents to be carried to the motors based on current values measured by the current measuring means. Specifically, when the robot is stationary, constant upper limits of currents are set according to the torques of the motors required to maintain a predetermined posture. Thus, it is possible to appropriately limit driving torques applied to the joints according to the posture of the robot.

PRIOR ART

Patent Document

Patent Document 1: Japanese Patent Laid-Open No. 2008-073790

SUMMARY OF THE INVENTION

In a conventional robot including speed reducers that slow rotation of motors as described in Japanese Patent Laid-Open No. 2008-073790, the torque losses of the speed reducers increase as the rotation speeds of the speed reducers increase. In general, torques generated by motors decrease as the rotation speeds of the motors increase. Thus, as described in Japanese Patent Laid-Open No. 2008-073790, when the constant upper limits are set for the currents to be carried to the motors, desired torques cannot be output from the speed reducers due to an increase in the torque losses of the speed reducers with an increase in the rotation speeds of the motors and a decrease in the torques generated by the motors (drives).

The present disclosure is intended to solve the above problem. The present disclosure aims to provide a current limiting device and a current limiting method capable of outputting a desired force or moment from a drive force transmitter even when the speed of a drive increases in a configuration in which an upper limit is set for a current to be carried to the drive.

In order to attain the aforementioned object, a current limiting device according to a first aspect of the present disclosure limits a current to be carried to a drive that generates a force or moment when the current is carried to the drive and transmits a drive force via a drive force transmitter, and includes a current limiter to limit the current to be carried to the drive within a range of a limit value. The limit value is set to change according to a speed of the drive.

In the current limiting device according to the first aspect of the present disclosure, as described above, the limit value of the current to be carried to the drive is set to change according to the speed of the drive. Accordingly, the limit value can be changed according to the loss of the drive force transmitter that changes according to the speed of the drive and a decrease in the force or moment generated by the drive. Consequently, in a configuration in which an upper limit is set for the current to be carried to the drive, a desired force or moment can be output from the drive force transmitter even when the speed of the drive increases.

A robot system according to a second aspect of the present disclosure includes a robot, and a robot controller configured or programmed to control the robot. The robot includes a joint, a motor provided at the joint, and a speed reducer to slow rotation of the motor. The robot controller includes a current limiter to limit a current to be carried to the motor within a range of a limit value, and the limit value is set to change according to a speed of the motor.

In the robot system according to the second aspect of the present disclosure, as described above, the limit value of the current to be carried to the motor is set to change according to the speed of the motor. Accordingly, the limit value can be changed according to the loss of the drive force transmitter that changes according to the speed of the motor and a decrease in the force or moment generated by the motor. Consequently, it is possible to provide the robot system capable of outputting a desired force or moment from the drive force transmitter even when the speed of the motor increases in a configuration in which an upper limit is set for the current to be carried to the motor.

A current limiting method according to a third aspect of the present disclosure is for limiting a current to be carried to a drive that generates a force or moment when the current is carried to the drive and transmits a drive force via a drive force transmitter, and includes acquiring a speed of the drive, setting a limit value of the current to be carried to the drive based on the acquired speed of the drive, and carrying the current to the drive within a range of the set limit value.

As described above, the current limiting method according to the third aspect of the present disclosure includes setting the limit value of the current to be carried to the drive based on the acquired speed of the drive. Accordingly, the limit value can be changed according to the loss of the drive force transmitter that changes according to the speed of the drive and a decrease in the force or moment generated by the drive. Consequently, it is possible to provide the current limiting method capable of outputting a desired force or moment from the drive force transmitter even when the speed of the drive increases in a configuration in which an upper limit is set for the current to be carried to the drive.

According to the present disclosure, as described above, it is possible to output a desired force or moment from the drive force transmitter even when the speed of the drive increases in the configuration in which an upper limit is set for the current to be carried to the drive.

MODES FOR CARRYING OUT THE INVENTION

An embodiment embodying the present disclosure is hereinafter described on the basis of the drawings.

The configuration of a robot system 100 according to this embodiment is now described with reference to FIGS. 1 to 11.

Figure 1:
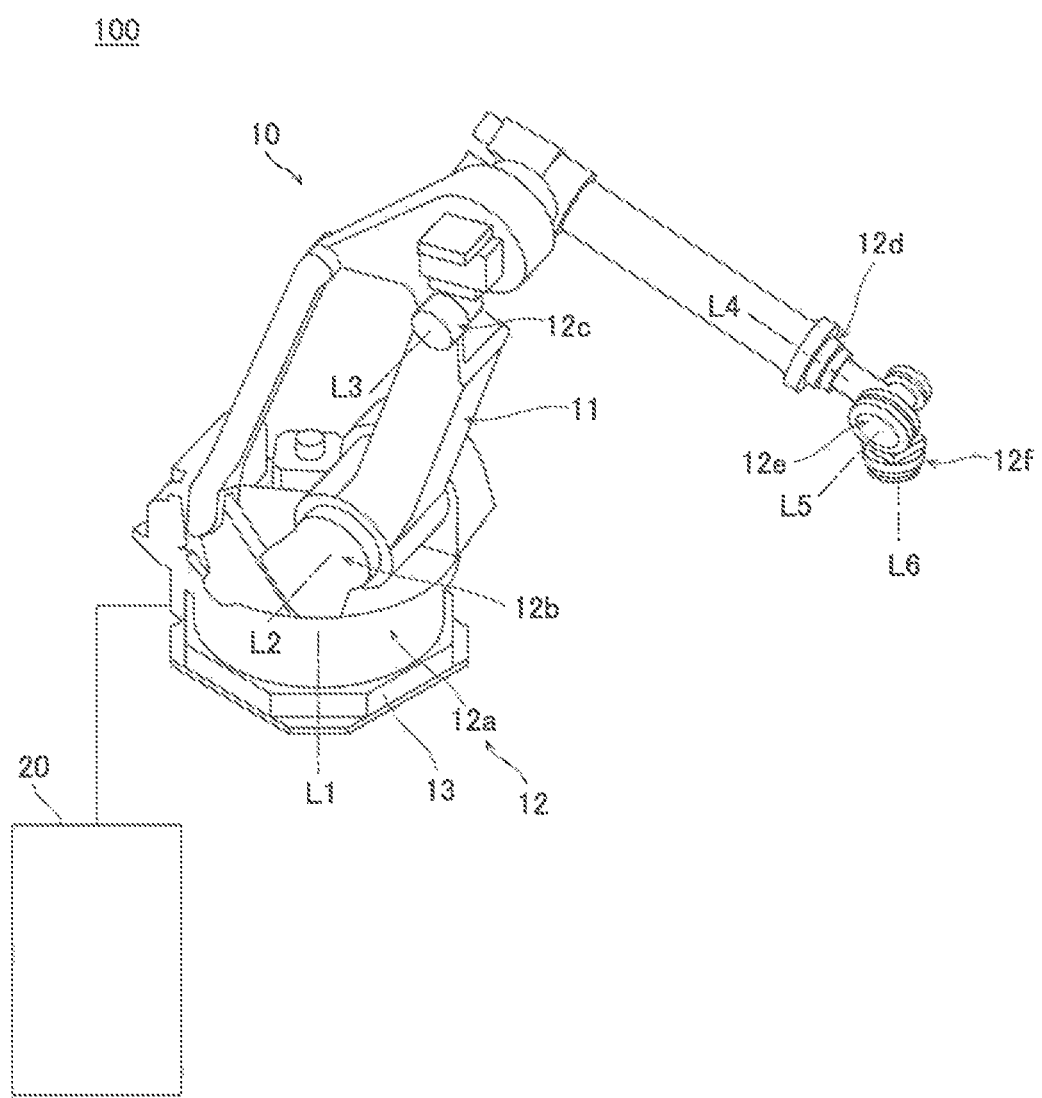
FIG. 1 is a diagram showing the configuration of a robot system according to an embodiment of the present disclosure.

As shown in FIG. 1, the robot system 100 includes a robot 10 and a robot controller 20 that controls the robot 10. The robot 10 is a six-axis robot, for example. Furthermore, the robot 10 is an industrial robot, for example.

As shown in FIG. 1, the robot 10 includes an arm 11. The arm 11 includes joints 12. A plurality of joints 12 are provided. For example, six joints 12 (joints 12a to 12f) are provided. The arm 11 is attached to a base 13. The joint 12a is rotatable about an axis L1 extending in a vertical direction. The joint 12b is rotatable about an axis L2 extending in a horizontal direction. The joint 12c is rotatable about an axis L3 extending parallel to the axis L2.

The joint 12d is rotatable about an axis L4 perpendicular to the axis L3. The joint 12e is rotatable about an axis L5 perpendicular to the axis L4. The joint 12f is rotatable about an axis L6 perpendicular to the axis L5.

Figure 2:
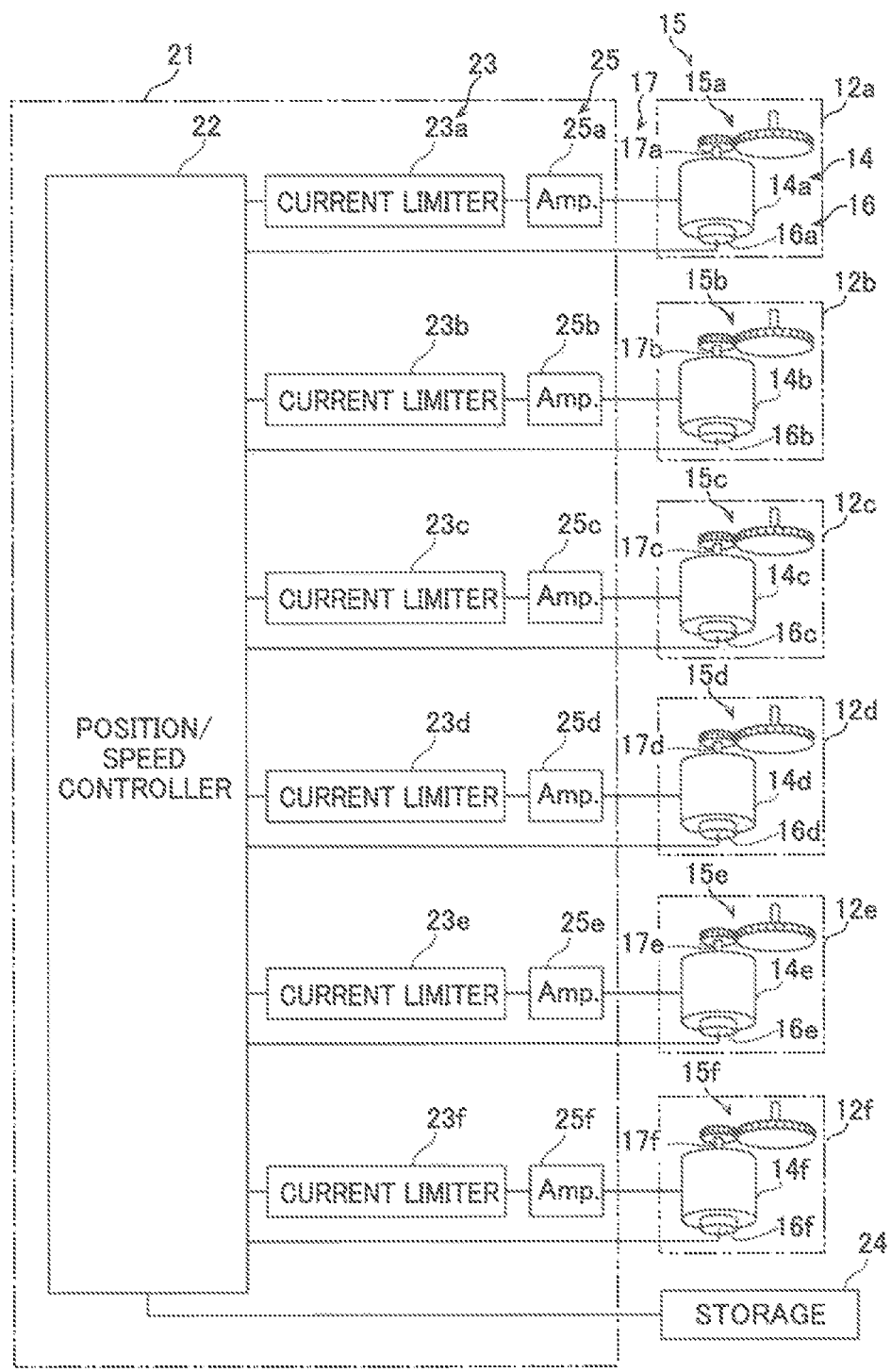
FIG. 2 is a block diagram of a robot controller according to the embodiment of the present disclosure.

As shown in FIG. 2, motors 14a to 14f are provided at the joints 12a to 12f, respectively. Speed reducers 15a to 15f that transmit the drive forces of the motors 14a to 14f are provided at the motors 14a to 14f, respectively. Each of the motors 14a to 14f generates a force or moment (torque in this embodiment) when a current is carried to the motor, and transmit a drive force via the corresponding speed reducer 15a, 15b, 15c, 15d, 15e, or 15f. The speed reducers 15a to 15f slow rotation of the motors 14a to 14f and transmit the rotation of the motors 14a to 14f, respectively. Thus, the joints 12a to 12f rotate. The motors 14a to 14f may be collectively referred to as a motor 14 below. In addition, the speed reducers 15a to 15f may be collectively referred to as a speed reducer 15 below. The motor 14 (14a to 14f) is an example of a drive. The speed reducer 15 (15a to 15f) is an example of a drive force transmitter.

Encoders 16a to 16f are provided at the motors 14a to 14f, respectively. The encoders 16a to 16f detect the angular positions of output shafts 17a to 17f of the motors 14a to 14f, respectively. The detected angular positions of the output shafts 17a to 17f are transmitted to a position/speed controller 22 described below. The encoders 16a to 16f may be collectively referred to as an encoder 16 below. In addition, the output shafts 17a to 17f may be collectively referred to as an output shaft 17 below.

The robot controller 20 includes a current limiting device 21 that limits a current to be carried to the motor 14 that transmits a drive force via the speed reducer 15. The current limiting device 21 includes the position/speed controller 22 and a current limiter 23 that limits the current to be carried to the motor 14 within a limit value range.

The position/speed controller 22 is electrically connected to each of the motors 14a to 14f, and carries a current to each of the motors 14a to 14f to control a torque output from each of the motors 14a to 14f. The position/speed controller 22 includes a position controller 22a (see FIG. 3) and a speed controller 22b (see FIG. 3). A storage 24 is connected to the position/speed controller 22. The storage 24 stores a program for driving each of the motors 14a to 14f.

The current limiter 23 includes current limiters 23a to 23f provided for a plurality of motors 14a to 14f, respectively. Amplifiers 25a to 25f are provided between the current limiters 23a to 23f and the motors 14a to 14f, respectively. The amplifiers 25a to 25f may be collectively referred to as an amplifier 25 below.

Figure 3:
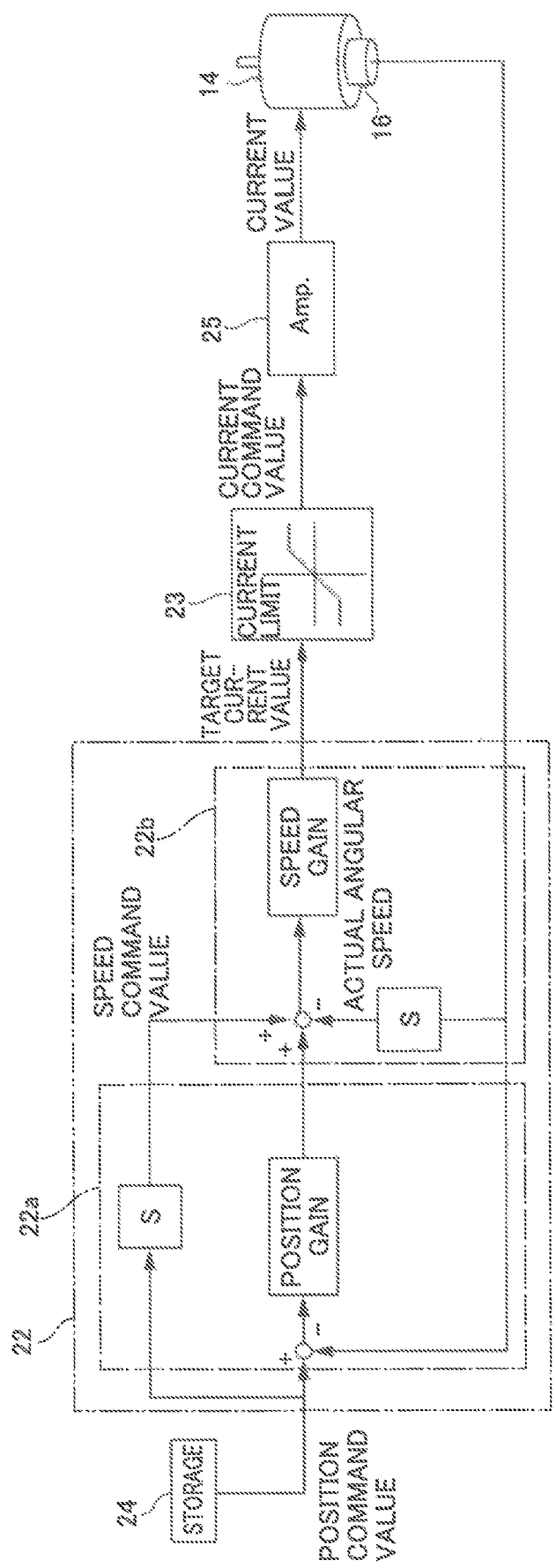
FIG. 3 is a control block diagram of the robot controller according to the embodiment of the present disclosure.

Control of the torque of the motor 14 is now described with reference to FIG. 3.

The position/speed controller 22 acquires a position command value (time history command position) of the joint 12 from the storage 24 (upper command device). Then, the position controller 22a calculates a deviation between the acquired position command value and the angular position (actual angular position) obtained from the encoder 16 of the joint 12. Then, the position controller 22a multiplies the calculated deviation by a position gain. The position controller 22a also differentiates the position command value to calculate a speed command value, which is the target speed of the joint 12.

Then, the speed controller 22b adds the deviation multiplied by the position gain and the generated speed command value and subtracts the actual angular speed obtained by differentiating the actual angular position from the added value to calculate a speed deviation. Then, the speed controller 22b multiplies the calculated speed deviation by a speed gain. Thus, the speed controller 22b generates a target current value corresponding to a target torque output from the motor 14.

Then, the speed controller 22b transmits the generated target current value to the current limiter 23. When the transmitted target current value is within a current limit value range, the current limiter 23 directly transmits the target current value to the amplifier 25. On the other hand, when the transmitted target current value is outside the current limit value range, the current limiter 23 limits the target current value to a value within the current limit value range and transmits the target current value to the amplifier 25.

Figure 8:
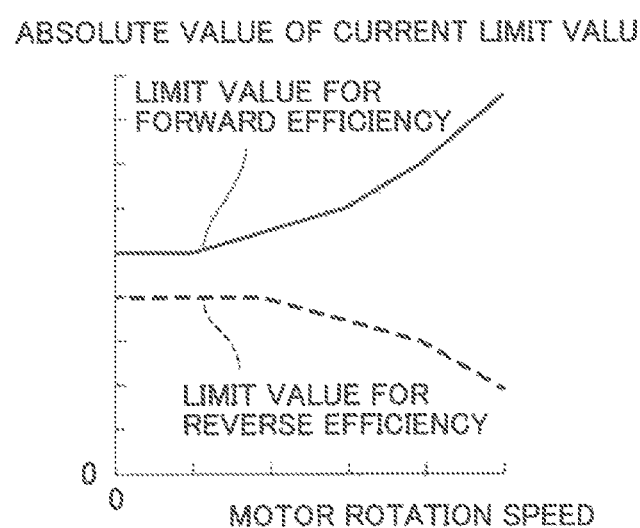
FIG. 8 is a diagram showing limit values for the forward efficiency and for the reverse efficiency that vary according to the rotation speed of the motor.

In this embodiment, the limit value of the current to be carried to the motor 14 is set to change according to the speed of the motor 14 (see FIG. 8). One of the reasons for setting the current limit value is to make the torque output by the motor 14 equal to or less than an allowable torque of a drive system (such as a torque to reduce or prevent damage to the speed reducer 15).

Figure 4:
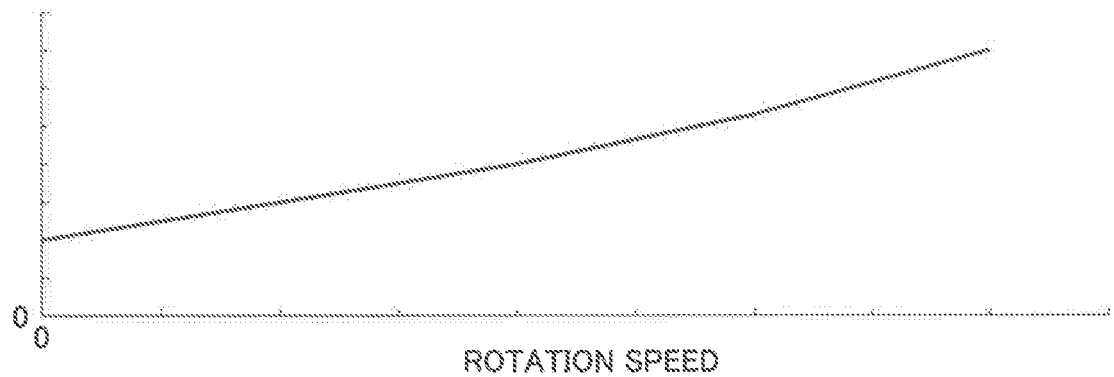
FIG. 4 is a diagram showing a relationship between the rotation speed of a motor and the torque loss of a speed reducer.

On the other hand, as shown in FIG. 4, as the rotation speed (horizontal axis) of the speed reducer 15 increases, the torque loss (vertical axis) of the speed reducer 15 increases. Specifically, in the speed reducer 15, Coulomb friction and viscous friction occur. The Coulomb friction is proportional to a force applied to the speed reducer 15. The viscous friction is caused by the viscosity of grease or oil contained in the speed reducer 15 and increases as the rotation speed of the speed reducer 15 increases.

Figure 5:
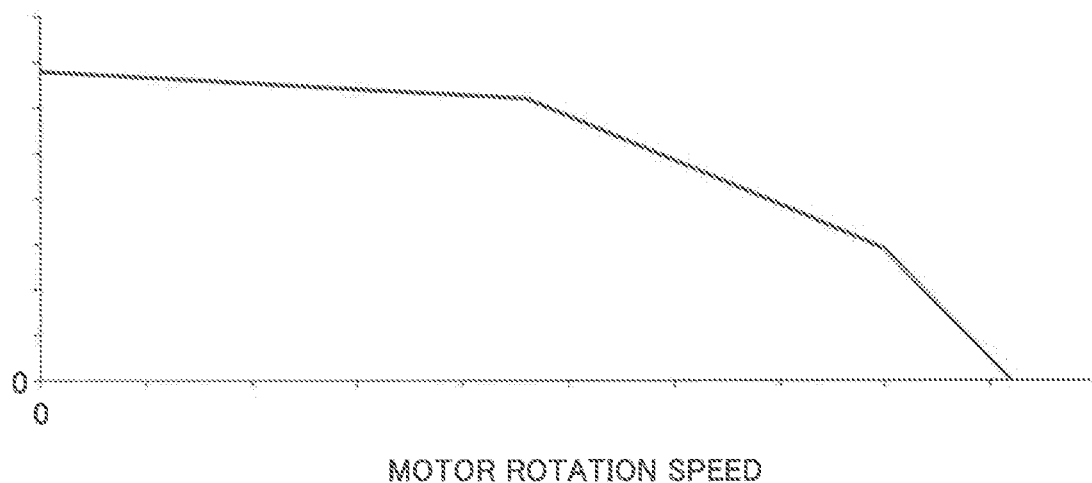
FIG. 5 is a diagram showing a relationship between the rotation speed of the motor and a torque generated from the motor.

As shown in FIG. 5, the torque (vertical axis) generated by the motor 14 decreases as the rotation speed (horizontal axis) of the motor 14 increases. This is because as the rotation speed (number of rotations) of the motor 14 increases, a back electromotive force generated in the motor 14 increases, and it becomes difficult for a current to flow through the motor 14.

Figure 6:
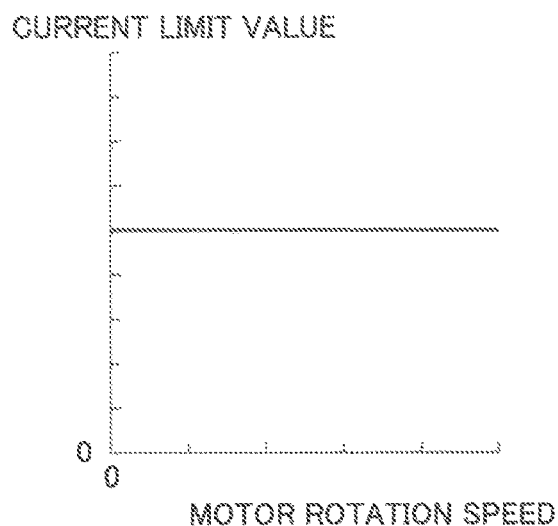
FIG. 6 is a diagram showing limit values that are constant regardless of the rotation speed of the motor.

As shown in FIG. 6, when the current limit value is constant regardless of the rotation speed of the motor 14, in a region in which the rotation speed of the motor 14 is relatively high, the torque loss of the speed reducer 15 increases and the torque generated by the motor 14 decreases, and thus a desired torque cannot be generated from the speed reducer 15.

Therefore, in this embodiment, as shown in FIG. 8, the absolute value of the limit value is set to increase (in the case of forward efficiency described below) or decrease (in the case of reverse efficiency described below) as the speed (rotation speed) of the motor 14 increases. Furthermore, the absolute value of the limit value is set to gradually increase or decrease as the rotation speed of the motor 14 increases. When the torque loss of the speed reducer 15 is caused only by friction, the absolute value of the limit value gradually increases or decreases as the rotation speed of the motor 14 increases. However, depending on the control of the motor 14, the absolute value of the limit value may be decreased according to the rotation speed of the motor 14, and the absolute value may be increased after a certain rotation speed.

As shown in FIG. 4, the rate of increase in the torque loss of the speed reducer 15 increases as the rotation speed of the speed reducer 15 increases. As shown in FIG. 5, the rate of decrease in the torque generated by the motor 14 increases as the rotation speed of the speed reducer 15 increases. Therefore, in this embodiment, the rate of change of the limit value is set to increase as the speed (rotation speed) of the motor 14 increases. The rate of change of the limit value in FIG. 8 is an example, and the rate of change of the limit value may not increase as the speed (rotation speed) of the motor 14 increases. That is, the rate of change of the limit value is set to follow a change in the torque loss of the speed reducer 15.

A case in which the driving direction (rotating direction) of the motor 14 and the direction of the force or moment (torque in this embodiment) output from the motor 14 are the same as each other is referred to as the forward efficiency. In other words, in the case of the forward efficiency, a torque is transmitted from the motor 14 side to the speed reducer 15 side in the motor 14 and the speed reducer 15. The forward efficiency corresponds to a case in which the rotation of the joint 12 is accelerated by the motor 14, for example. At the time of forward efficiency, the torque loss of the speed reducer 15 contributes negatively to the torque generated by the motor 14.

A case in which the driving direction (rotating direction) of the motor 14 and the direction of the force or moment (torque in this embodiment) output from the motor 14 are opposite to each other is referred to as the reverse efficiency. In other words, in the case of the reverse efficiency, a torque is transmitted from the output side of the speed reducer 15 to the motor 14 side. The reverse efficiency corresponds to a case in which the deceleration of the motor 14 is large, for example. At the time of reverse efficiency, the torque loss of the speed reducer 15 contributes positively to the torque generated by the motor 14. Thus, the contribution of the torque loss of the speed reducer 15 to the torque generated by the motor 14 differs between the forward efficiency and the reverse efficiency.

Therefore, in this embodiment, as shown in FIG. 8, the current limit value includes a limit value for the forward efficiency in which the driving direction (rotating direction) of the motor 14 and the direction of the force or moment (torque in this embodiment) output from the motor 14 are the same as each other, and a limit value for the reverse efficiency having a value different from the limit value for the forward efficiency, in which the driving direction (rotating direction) of the motor 14 and the direction of the force or moment (torque in this embodiment) output from the motor 14 are opposite to each other. The limit value for the forward efficiency and the limit value for the reverse efficiency are set to change according to the speed (rotation speed) of the motor 14. The absolute value of the limit value for the forward efficiency is greater than the absolute value of the limit value for the reverse efficiency.

Figure 7:
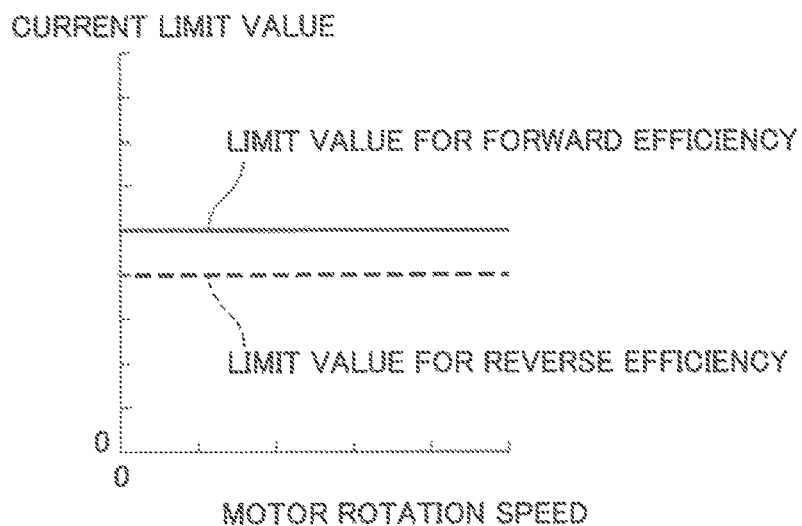
FIG. 7 is a diagram showing limit values for forward efficiency and for reverse efficiency that are constant regardless of the rotation speed of the motor.

As shown in FIG. 7, when the limit value for the forward efficiency is constant regardless of the rotation speed of the motor 14, the torque loss of the speed reducer 15, which contributes negatively, increases as the rotation speed of the motor 14 increases, and the torque on the output side of the speed reducer 15 decreases. When the limit value for the reverse efficiency is constant regardless of the rotation speed of the motor 14, the torque loss of the speed reducer 15, which contributes positively, increases as the rotation speed of the motor 14 increases, and a relatively large torque is applied to the speed reducer 15. Therefore, the speed reducer 15 may be damaged, a bolt of the speed reducer 15 may be loosened, and the load (stress) on the arm may increase during deceleration.

Therefore, in this embodiment, as shown in FIG. 8, the absolute value of the limit value for the forward efficiency is set to increase as the rotation speed of the motor 14 increases, and the absolute value of the limit value for the reverse efficiency is set to decrease as the rotation speed of motor 14 increases.

As described above, the rate of increase in the torque loss of the speed reducer 15 increases as the rotation speed of the speed reducer 15 increases (see FIG. 4). Furthermore, the rate of decrease in the torque generated by the motor 14 increases as the rotation speed of the motor 14 increases (see FIG. 5). Therefore, in this embodiment, the rate of increase in the limit value for the forward efficiency and the rate of decrease in the limit value for the reverse efficiency are set to increase as the rotation speed of the motor 14 increases.

Figure 9:
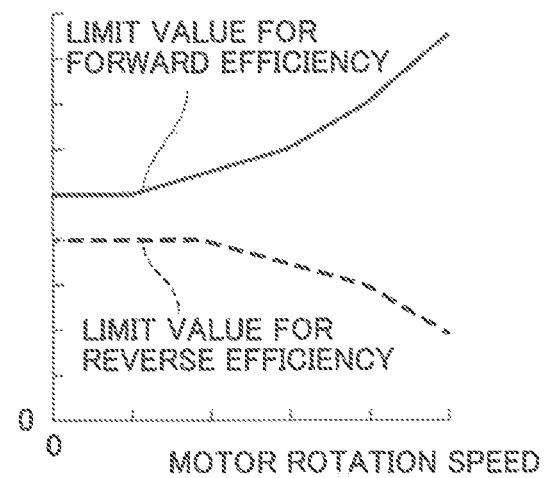
FIG. 9 is a diagram showing limit values for the forward efficiency and for the reverse efficiency when the motor rotates in a positive direction.

Specifically, as shown in FIG. 9, when a current is carried to the motor 14 in a positive direction (the current command value is positive) and the motor 14 rotates is in the positive direction (forward efficiency), the limit value for the forward efficiency is positive, and increases as the rotation speed of the motor 14 increases. When a current is carried to the motor 14 in the positive direction (the current command value is positive) and the motor 14 rotates in a negative direction (reverse efficiency), the limit value for the reverse efficiency is positive, and decreases as the rotation speed of the motor 14 increases.

Figure 10:
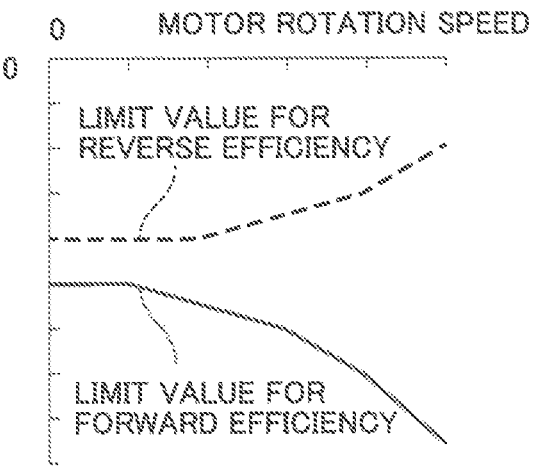
FIG. 10 is a diagram showing limit values for the forward efficiency and for the reverse efficiency when the motor rotates in a negative direction.

As shown in FIG. 10, when a current is carried to the motor 14 in the negative direction (the current command value is negative) and the motor 14 rotates in the negative direction (forward efficiency), the limit value for the forward efficiency is negative, and decreases (its absolute value increases) as the rotation speed of the motor 14 increases. When a current is carried to the motor 14 in the negative direction (the current command value is negative) and the motor 14 rotates in the positive direction (reverse efficiency), the limit value for the reverse efficiency is negative, and increases (its absolute value decreases) as the rotation speed of the motor 14 increases.

In this embodiment, the limit value is set to reduce or prevent damage to the speed reducer 15 due to the force or moment (torque in this embodiment) generated by the motor 14 and maintain the force or moment (torque in this embodiment) on the output side of the speed reducer 15 at a constant value. Specifically, the limit value for the forward efficiency is set such that the torque on the output side of the speed reducer 15 is maintained constant even when the rotation speed of the motor 14 increases. In other words, the limit value for the forward efficiency is set to compensate for the torque loss of the speed reducer 15 and a decrease in the torque generated by the motor 14 (and to reduced or prevent damage to the speed reducer 15). The limit value for the reverse efficiency is set to reduce or prevent damage to the speed reducer 15 due to an increase in the torque loss of the speed reducer 15 even when the rotation speed of the motor 14 increases. The motor 14 is actually driven, and the torque loss of the speed reducer 15 and the decrease in the torque of the motor 14 are measured such that the limit value for the forward efficiency and the limit value for the reverse efficiency are acquired based on the results of these measurements.

Figure 11:
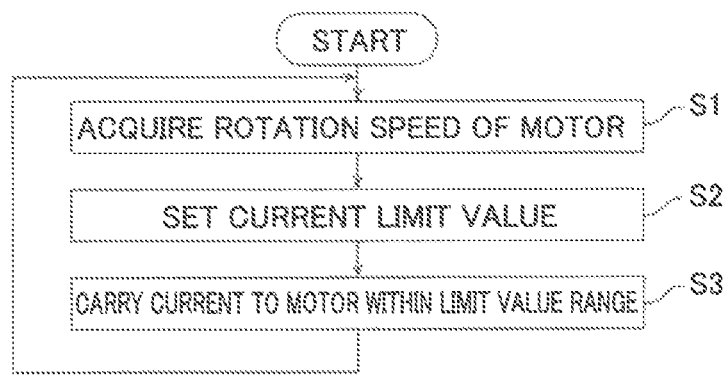
FIG. 11 is a flowchart for illustrating a current limiting method according to the embodiment of the present disclosure.

A current limiting method for limiting the current to be carried to the motor 14 that transmits a drive force via the speed reducer 15 is now described with reference to FIG. 11.

In step S1, the current limiting device 21 acquires the speed (rotation speed) of the motor 14. Specifically, the speed (command speed) is acquired by differentiating the time history command position from the upper command device. The rotation speed of the motor 14 may be acquired based on the angular position of the output shaft 17 of the motor 14 acquired from the encoder 16.

In step S2, the current limiter 23 sets the limit value of the current to be carried to the motor 14 based on the acquired speed (rotation speed) of the motor 14.

In step S3, the current limiter 23 carries a current to the motor 14 within the set limit value range. The operations in step S1 to step S3 are repeated while the motor 14 is in operation.

Advantages of this Embodiment

According to this embodiment, the following advantages are achieved.

According to this embodiment, as described above, the limit value of the current to be carried to the motor 14 is set to change according to the rotation speed of the motor 14. Accordingly, the limit value can be changed according to the loss of the speed reducer 15 that changes according to the rotation speed (speed) of the motor 14 and the decrease in the torque generated by the motor 14. Consequently, in a configuration in which an upper limit is set for the current to be carried to the motor 14, the desired torque can be output from the speed reducer 15 even when the rotation speed of the motor 14 increases.

According to this embodiment, as described above, the absolute value of the limit value is set to increase or decrease as the rotation speed of the motor 14 increases. The loss of the speed reducer 15 may contribute positively (reverse efficiency) or negatively (forward efficiency) to the torque generated by the motor 14. Therefore, when the loss of the speed reducer 15 contributes negatively to the force generated by the motor 14, the limit value for the forward efficiency is increased as the rotation speed of the motor 14 increases such that the current to be carried to the motor 14 can be adjusted so as to compensate for the decrease in the torque generated by the motor 14 and the loss of the speed reducer 15. When the loss of the speed reducer 15 contributes positively to the force generated by the motor 14, the limit value for the reverse efficiency is decreased as the rotation speed of the motor 14 increases such that the current to be carried to the motor 14 can be adjusted so as to remove an amount by which the loss of the speed reducer 15 contributes positively. Consequently, the current to be carried to the motor 14 can be appropriately adjusted both when the loss of the speed reducer 15 contributes positively and when it contributes negatively.

According to this embodiment, as described above, the rate of change of the limit value is set to increase as the rotation speed of the motor 14 increases. Accordingly, the rate of change of the loss of the speed reducer 15 and the rate of change of the decrease in the torque generated by the motor 14 increase as the rotation speed of the motor 14 increases, and thus the rate of change of the limit value is set to increase as the rotation speed of the motor 14 increases such that the current to be carried to the motor 14 can be more appropriately adjusted. Consequently, the torque of the motor 14 can be appropriately adjusted.

According to this embodiment, as described above, the current limit value includes the limit value for the forward efficiency in which the driving direction (rotating direction) of the motor 14 and the direction of the force or moment (torque in this embodiment) output from the motor 14 are the same as each other, and the limit value for the reverse efficiency having a value different from the limit value for the forward efficiency, in which the driving direction (rotating direction) of the motor 14 and the direction of the force or moment (torque in this embodiment) output from the motor 14 are opposite to each other. Furthermore, the limit value for the forward efficiency and the limit value for the reverse efficiency are set to change according to the rotation speed of the motor 14. The loss of the speed reducer 15 contributes negatively to the force generated by the motor 14 in the case of the forward efficiency, and the loss of the speed reducer 15 contributes positively to the force generated by the motor 14 in the case of the reverse efficiency. Therefore, as described above, the limit value includes the limit value for the forward efficiency and the limit value for the reverse efficiency having a value different from the limit value for the forward efficiency such that in both cases of the forward efficiency and the reverse efficiency, the current to be carried to the motor 14 can be appropriately adjusted.

According to this embodiment, as described above, the absolute value of the limit value for the forward efficiency is set to increase as the rotation speed of the motor 14 increases, and the absolute value of the limit value for the reverse efficiency is set to decrease as the rotation speed of the motor 14 increases. Accordingly, in the case of the forward efficiency, the loss of the speed reducer 15 contributes negatively to the torque generated by the motor 14, and thus the absolute value of the limit value for the forward efficiency is set to increase as the rotation speed of the motor 14 increases such that the current to be carried to the motor 14 can be appropriately adjusted to compensate for the decrease in the torque generated by the motor 14 and the loss of the speed reducer 15. In the case of the reverse efficiency, the loss of the speed reducer 15 contributes positively to the torque generated by the motor 14, and thus the absolute value of the limit value for the reverse efficiency is set to decrease as the rotation speed of the motor 14 increases such that damage to the speed reducer 15 due to application of an excessive torque to the speed reducer 15 can be reduced or prevented.

According to this embodiment, as described above, the rate of increase in the limit value for the forward efficiency and the rate of decrease in the limit value for the reverse efficiency are set to increase as the rotation speed of the motor 14 increases. Accordingly, the rate of increase in the loss of the speed reducer 15 and the rate of decrease in the torque generated by the motor 14 increase as the rotation speed of the motor 14 increases, and thus the rate of increase in the limit value for the forward efficiency and the rate of decrease in the limit value for the reverse efficiency are set to increase as the rotation speed of the motor 14 increases such that the current to be carried to the motor 14 can be more appropriately adjusted.

According to this embodiment, as described above, the limit value is set to change according to the rotation speed of the motor 14. Accordingly, the limit value can be changed according to the torque loss of the speed reducer 15 that changes according to the rotation speed of the motor 14 and the decrease in the torque generated by the motor 14. Consequently, when the rotation speed of the motor 14 increases, the current to be carried to the motor 14 can be adjusted to account for the loss of the speed reducer 15 and the decrease in the torque generated by the motor 14, and thus a desired torque can be output from the speed reducer 15 even when the rotation speed of the motor 14 increases.

According to this embodiment, as described above, the limit value is set to reduce or prevent damage to the speed reducer 15 due to the torque generated by the motor 14 and to maintain the torque on the output side of the speed reducer 15 at a constant value. Accordingly, a desired torque can be output from the speed reducer 15 while damage to the speed reducer 15 is reduced or prevented.

According to this embodiment, as described above, the motor 14 is provided at the joint 12 of the robot 10. Accordingly, even when the rotation speed of the motor 14 provided at the joint 12 of the robot 10 increases, a desired torque can be output from the speed reducer 15.

MODIFIED EXAMPLES

The embodiment disclosed this time must be considered as illustrative in all points and not restrictive. The scope of the present disclosure is not shown by the above description of the embodiment but by the scope of claims for patent, and all modifications (modified examples) within the meaning and scope equivalent to the scope of claims for patent are further included.

Figure 12:
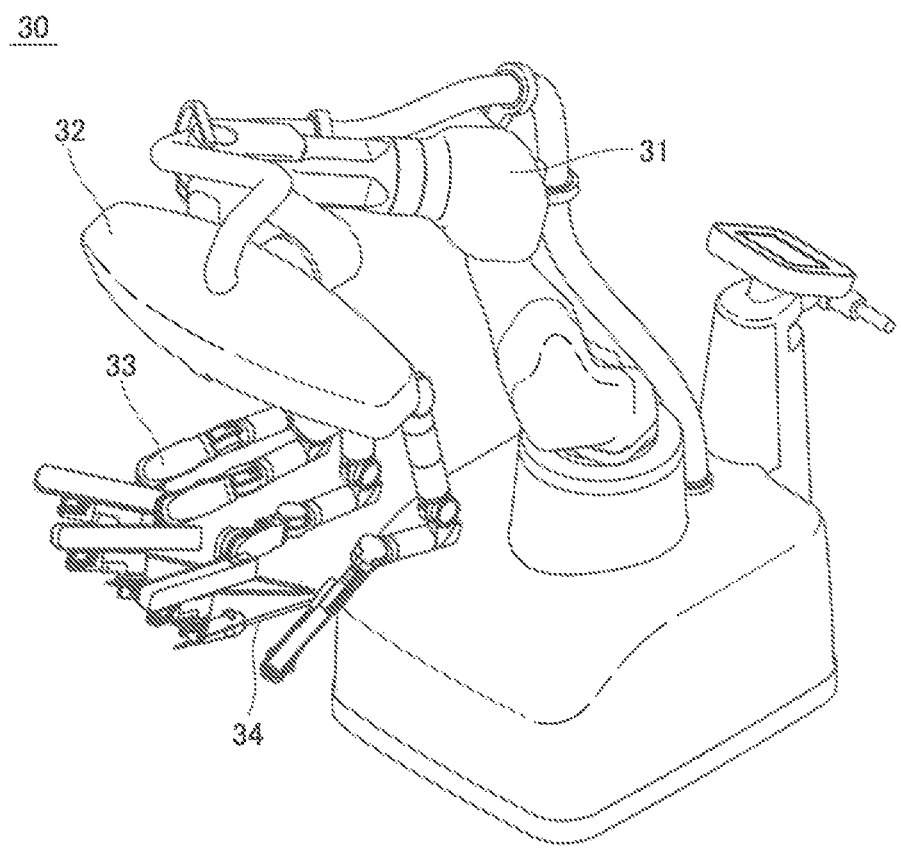
FIG. 12 is a diagram showing the configuration of a medical robot according to a modified example.

For example, while the example in which the present disclosure is applied to the industrial robot 10 has been shown in the aforementioned embodiment, the present disclosure is not limited to this. For example, as shown in FIG. 12, the present disclosure may be applied to a medical robot 30. The robot 30 includes a positioner 31 (articulated robot), an arm base 32, and a plurality of arms 33. A surgical instrument 34 is attached to the tip end of each of the plurality of arms 33. The current limiting device of the present disclosure limits a current to be carried to the positioner 31 (articulated robot) and motors at joints of the arms 33, for example. Thus, in the medical robot 30, even when the speed (rotation speed) of the motor 14 increases, a desired torque can be output from the speed reducer 15.

In particular, the medical robot 30 has a limited space for arranging the medical robot 30, includes many joints, and needs to have a low drive voltage to reduce the impact at the time of collision, for example, and thus a low-output motor 14 may be used with a high reduction ratio. In this case, the influence of the friction of a drive system increases, and thus it is particularly effective to change the current limit value according to the rotation speed of the motor 14 as in the present disclosure.

While the example in which the motor 14 is applied as the "drive" of the present disclosure has been shown in the aforementioned embodiment, the present disclosure is not limited to this. For example, an actuator such as a proportional solenoid, a linear motor, a voice coil, or a spherical actuator may be applied as the "drive" of the present disclosure. Alternatively, a powder clutch/brake or a hysteresis clutch/brake may be applied as the "drive" of the present disclosure.

While the example in which the speed reducer 15 is applied as the "drive force transmitter" of the present disclosure has been shown in the aforementioned embodiment, the present disclosure is not limited to this. For example, when the motor is a linear motor that moves linearly, the drive force transmitter transmits a force of linear movement of the linear motor. Furthermore, the limit value is set to change according to the linear movement speed of the linear motor.

While the example in which the absolute value of the limit value for the forward efficiency is set to gradually increase as the rotation of the motor 14 increases, and the absolute value of the limit value for the reverse efficiency is set to gradually decrease as the rotation of the motor 14 increases has been shown in the aforementioned embodiment, the present disclosure is not limited to this. For example, the absolute value of the limit value for the forward efficiency may be set to increase stepwise as the rotation of the motor 14 increases, and the absolute value of the limit value for the reverse efficiency may be set to decrease stepwise as the rotation of the motor 14 increases.

While the example in which the rate of change of the limit value is set to increase as the speed of the motor increases has been shown in the aforementioned embodiment, the present disclosure is not limited to this. For example, when the rate of change of a decrease in the torque generated by the motor 14 is small (close to linear) with the torque loss of the speed reducer 15 or an increase in the rotation speed of the motor 14, the rate of change of the limit value may be constant.

While the example in which the limit value for the forward efficiency and the limit value for the reverse efficiency are set has been shown in the aforementioned embodiment, the present disclosure is not limited to this. For example, when a difference between the limit value for the forward efficiency and the limit value for the reverse efficiency is small, a common limit value may be set for both the forward efficiency and the reverse efficiency.

While the example in which the absolute value of the limit value for the reverse efficiency is set to decrease as the rotation speed of the motor 14 increases has been shown in the aforementioned embodiment, the present disclosure is not limited to this. For example, depending on the control of the motor 14, the absolute value of the limit value for the reverse efficiency may be set to decrease as the rotation speed of the motor 14 increases in a high-speed range of the rotation speed of the motor 14.

Figure 13:
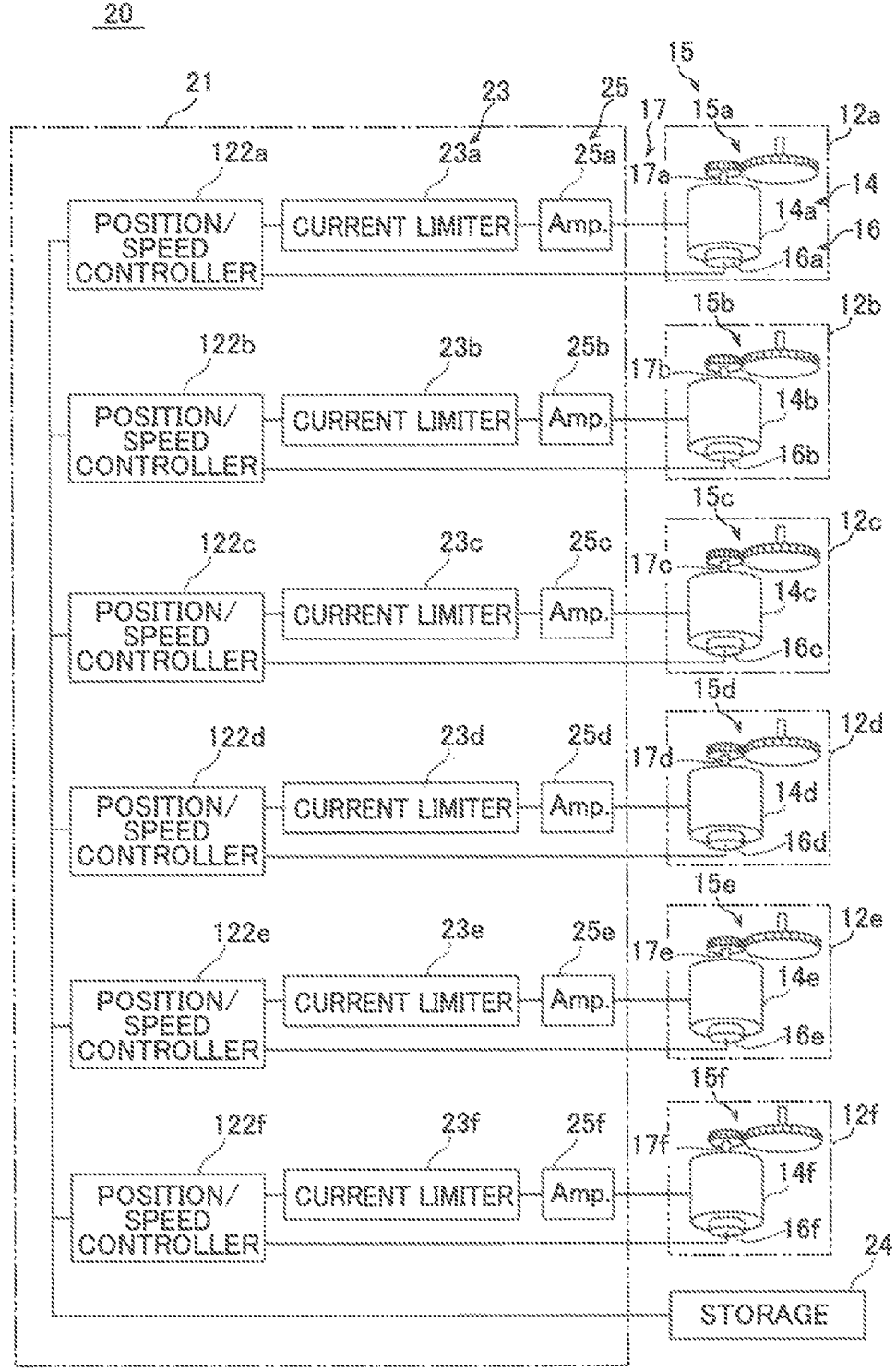
FIG. 13 is a block diagram (1) showing the configuration of a robot controller according to a modified example.

While the example in which the position/speed controller 22 is provided in common (one) for the motors 14a to 14f has been shown in the aforementioned embodiment, the present disclosure is not limited to this. For example, as shown in FIG. 13, position/speed controllers 122a to 122f may be provided individually for motors 14a to 14f.

Figure 14:
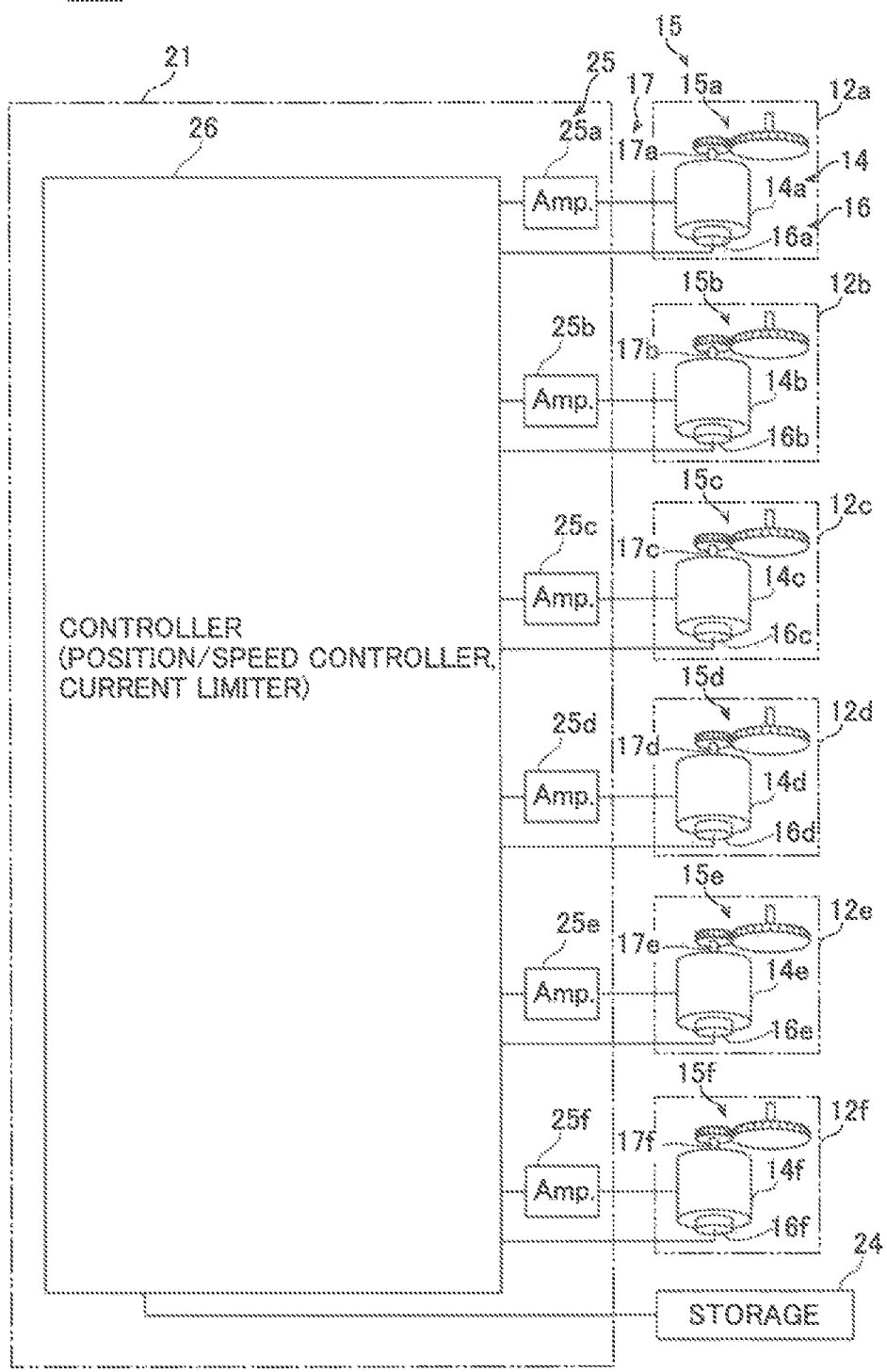
FIG. 14 is a block diagram (2) showing the configuration of a robot controller according to a modified example.

While the example in which the position/speed controller 22 is provided separately from the current limiter 23a to 23f has been shown in the aforementioned embodiment, the present disclosure is not limited to this. For example, as shown in FIG. 14, one controller 26 including a position/speed controller and a current limiter may be provided.

While the example in which the current limiter 23 is provided upstream of the amplifier 25 has been shown in the aforementioned embodiment, the present disclosure is not limited to this. In the present disclosure, the current limiter 23 is only required to be provided somewhere (such as on the output side of the amplifier 25 or in a line fed back from the encoder 16) in a line that connects the position/speed controller 22 to the motor 14.

DESCRIPTION OF REFERENCE NUMERALS

10: robot
12, 12a to 12f: joint
14, 14a to 14f: motor (drive)
15, 15a to 15f: speed reducer (drive force transmitter)
20: robot controller
21: current limiting device
23, 23a to 23f: current limiter
30: robot (medical robot)
100: robot system

The invention claimed is:

1. A current limiting device to limit a current to be carried to a drive that generates a force or moment when the current is carried to the drive and transmits a drive force via a drive force transmitter, the current limiting device comprising:
a current limiter to limit the current to be carried to the drive within a range of a limit value; wherein
the limit value is set to change according to a speed of the drive;
the limit value includes a limit value for forward efficiency in which a driving direction of the drive and a direction of the force or moment output from the drive are the same as each other, and a limit value for reverse efficiency having a value different from the limit value for the forward efficiency, in which the driving direction of the drive and the direction of the force or moment output from the drive are opposite to each other; and
the limit value for the forward efficiency and the limit value for the reverse efficiency are set to linearly change according to a value of the speed of the drive.

2. The current limiting device according to claim 1, wherein an absolute value of the limit value is set to increase or decrease as the speed of the drive increases.

3. The current limiting device according to claim 2, wherein a rate of change of the limit value is set to increase as the speed of the drive increases.

4. The current limiting device according to claim 1, wherein
an absolute value of the limit value for the forward efficiency is set to increase as the speed of the drive increases; and
an absolute value of the limit value for the reverse efficiency is set to decrease as the speed of the drive increases.

5. The current limiting device according to claim 4, wherein
a rate of increase in the limit value for the forward efficiency and a rate of decrease in the limit value for the reverse efficiency are set to increase as the speed of the drive increases.

6. The current limiting device according to claim 1, wherein
the drive includes a motor;
the drive force transmitter includes a speed reducer to slow rotation of the motor and transmit the rotation; and
the limit value is set to change according to a rotation speed of the motor.

7. The current limiting device according to claim 1, wherein the limit value is set to reduce or prevent damage to the drive force transmitter due to the force or moment generated by the drive and to maintain a force or moment on an output side of the drive force transmitter at a constant value.

8. The current limiting device according to claim 1, wherein the drive includes a motor provided at a joint of a robot.

9. The current limiting device according to claim 8, wherein the robot includes a medical robot.

10. A robot system comprising:
a robot; and
a robot controller configured or programmed to control the robot; wherein
the robot includes:
a joint;
a motor provided at the joint; and
a speed reducer to slow rotation of the motor;
the robot controller includes a current limiter to limit a current to be carried to the motor within a range of a limit value;
the limit value is set to change according to a speed of the motor;
the limit value includes a limit value for forward efficiency in which a driving direction of the motor and a direction of the force or moment output from the motor are the same as each other, and a limit value for reverse efficiency having a value different from the limit value for the forward efficiency, in which the driving direction of the motor and the direction of the force or moment output from the motor are opposite to each other; and
the limit value for the forward efficiency and the limit value for the reverse efficiency are set to linearly change according to a value of the speed of the motor.

11. A current limiting method for limiting a current to be carried to a drive that generates a force or moment when the current is carried to the drive and transmits a drive force via a drive force transmitter, the current limiting method comprising:
acquiring a speed of the drive;

setting a limit value of the current to be carried to the drive based on the acquired speed of the drive; and carrying the current to the drive within a range of the set limit value, wherein the limit value includes a limit value for forward efficiency in which a driving direction of the drive and a direction of the force or moment output from the drive are the same as each other, and a limit value for reverse efficiency having a value different from the limit value for the forward efficiency, in which the driving direction of the drive and the direction of the force or moment output from the drive are opposite to each other; and the limit value for the forward efficiency and the limit value for the reverse efficiency are set to linearly change according to a value of the speed of the drive.

* * * * *